United States Patent [19]

Gillberg-Laforce et al.

[11] Patent Number: 5,246,748

[45] Date of Patent: Sep. 21, 1993

[54] THIN FILM OPTICAL MEDIUM OF A MULTIPLE AMPHIPHILIC BILAYER COMPOSITE

[75] Inventors: Gunilla E. Gillberg-Laforce, Summit, N.J.; David E. Nikles, Tuscaloosa, Ala.; Leroy McKenzie, Newark; Bettina E. Bonsall, Bridgewater, both of N.J.

[73] Assignee: Hoechst Celanese Corp., Somerville, N.J.

[21] Appl. No.: 812,596

[22] Filed: Dec. 23, 1991

[51] Int. Cl.$^5$ ............................................. C09K 19/00
[52] U.S. Cl. ........................................ 428/1; 428/913; 252/582; 252/583; 252/299.01; 359/75; 359/328
[58] Field of Search .................. 252/582, 583, 299.01; 428/1, 913; 359/75, 328

[56] References Cited

U.S. PATENT DOCUMENTS 5,072,234  12/1991  Crystal ................................. 428/1

OTHER PUBLICATIONS

Shimomura et al, Polymer Journal, vol. 16, pp. 187–190 Feb. 1984.
Penner et al, Macromolecules vol. 24, pp. 1041–1049 Mar. 1991.

*Primary Examiner*—Patrick J. Ryan
*Assistant Examiner*—Elizabeth Evans
*Attorney, Agent, or Firm*—Michael W. Ferrell

[57] ABSTRACT

This invention provides novel self-assembled multilayer organic thin films including an azo-benzene chromophore which initially appear substantially amorphous when viewed perpendicular to the film surface, but are subsequently treated with a laser in selected areas so that such portions exhibit photo-induced birefringence.

1 Claim, No Drawings

THIN FILM OPTICAL MEDIUM OF A MULTIPLE AMPHIPHILIC BILAYER COMPOSITE

BACKGROUND OF THE INVENTION

Photochromism in organic systems is of interest because of potential utility in applications such as high density optical memories and optical switching devices.

Thermochromism and solvatochromism in multilayer organic systems are described in *Thin Solid Films*, 135 27 (1985). The organic layers in thin films are composed of merocyanine dyes.

The suitability of amphiphilic compounds which contain quaternary ammonium groups for the formation of ordered structures is described in *Thin Solid Films*, 121, 89 (1984).

Highly ordered bilayer films from a variety of synthetic amphiphiles which undergo spontaneous assemblage are described in *Macromolecules*, 18, 1515 (1985) and 20 (No. 1), 29 (1987).

Immobilization of synthetic bilayer membranes as multilayer polymer films are described in *Polym. J.*, 16, 187 (1984).

Aqueous bilayer dispersions, cast multilayer films and Langmuir-Blodgett films of azobenzene-containing amphilphiles are described in *Colloids and Surfaces*, 19, 225 (1986). Methods for formation of aqueous molecular membranes as immoblized cast films are reviewed.

Molecular orientation and domain formation in surface monolayers of azobenzene-containing amphiphiles and their polyion complexes are described in *Chem. Lett.*, 827 (1988).

Cis-trans reversible photoisomerization of an amphiphilic azobenzene derivative in a Langmuir-Blodgett film prepared as polyion complexes with polyallylamine is described in *Chem. Lett.*, 1257 (1988).

Reversible photochromic behavior of 4-octyl-4'-(5-carboxypentamethyleneoxy) azobenzene in organized (1990).

U.S. Pat. No. 4,941,997 describes amphiphilic azo dyes which form molecular aggregate bilayer thin films which exhibit reversible thermochromic and solvatochromic properties.

*Macromolecules*, 24, 1041 (1991) describes Langmuir-Blodgett films of "amphotropic" molecules, i.e., preformed amphiphilic polymers containing side chain mesogenic chromophores such as stilbene, azobenzene or biphenyl structures. The Langmuir-Blodgett liquid crystalline type films exhibit a phase change to a less ordered state on heating. The reversible transition occurs at the same temperature as the onset of liquid crystal formation in the bulk material. The reference suggests that heating a Langmuir-Blodgett film of amphotropic molecules above the crystalline to liquid crystalline transition in an external magnetic or electric field can induce a monodomain formation in the film.

There is continuing interest in the development of ordered organic thin film systems which can exhibit photochromic behavior for prospective utility in all-optical data storage or spatial light modulation devices.

DESCRIPTION OF THE INVENTION

In accordance with the present invention there is provided a thin film optical medium which is a composite comprising a nonionic water-soluble polymer, hydroxypropyl cellulose, and self-assembled multibilayers of an amphiphilic compound corresponding to the formula:

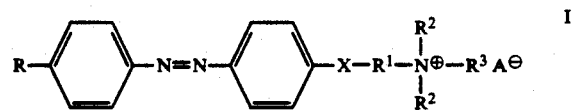

where R is an aliphatic substituent having a chain length of about 6-18 atoms; $R^1$ is a divalent aliphatic substituent having a chain length of about 2-12 atoms; $R^2$ is hydrogen or a $C_1$-$C_4$ alkyl substituent; $R^3$ is a $C_1$-$C_8$ saturated or unsaturated aliphatic substituent; X is a divalent electron-donating substituent; and $A^-$ is an anion.

In another embodiment this invention provides a thin film optical medium which is a composite comprising a water soluble monomer such as hydroxyethyl methacrylate and a self-assembled multi-bilayer of at least one amphiphilic acrylate compound corresponding to the formula:

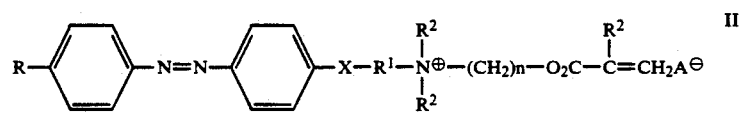

where R is an aliphatic substituent having a chain length of about 6-18 atoms; $R^1$ is a divalent aliphatic substituent having a chain length of about 2-12 atoms; $R^2$ is hydrogen or a $C_1$-$C_4$ alkyl substituent; X is a divalent electron-donating substituent; n is an integer with a value of 2-12; and A is an anion.

In formulas I and II generally, the R substituent is illustrated by aliphatic groups which include hexyl, decyl, dodecyl, octadecyl, hexyloxy, decyloxy, octadecyloxy, polyethyleneoxy, hexylthio, and the like.

The $R^1$ substituent in formulas I-II is illustrated by divalent aliphatic groups such as ethylene, butylene, decylene, dodecylene, polyethyleneoxy, and the like.

Illustrative of $R^2$ $C_1$-$C_4$ alkyl substituents are methyl, ethyl, propyl, isopropyl, and the like.

Illustrative of the $R^3$ substituents are methyl, hydroxyethyl, and the like.

The symbol $A^-$ in the formulas represents a monovalent anion such as that derived from inorganic and organic acids. Illustrative of $A^-$ are iodide, bromide, chloride, bi-phosphate, bi-sulfate, nitrate, trifluoromethylsulfonate, acetate, benzoate, citrate, tartrate, acrylate, and the like.

The water-soluble polymer component of the composites of the present invention is selected from nonionic polymers which include hydroxyalkylcellulose derivatives such as hydroxyethylcellulose, and hydroxypropylcellulose; guar gum; locust bean gum; xanthan gum; and the like. The selected water-soluble polymer per se can form films of high optical quality.

A suitable nonionic water-soluble polymer typically has a molecular weight in the range between 50,000-2,000,000, and has a solubility in water of at least about 1-10 weight percent at 25° C.

The content of the nonionic water-soluble polymer in a formula I-II composite can vary in the range between about 20-80 weight percent of the composite, and preferably is between about 20-50 weight percent of the composite.

Synthesis of Azobenzene Derivatives

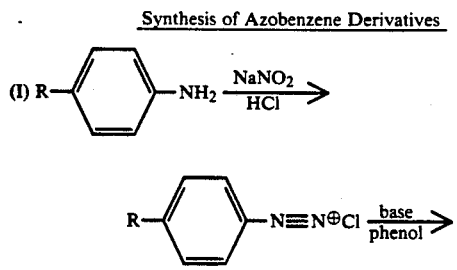

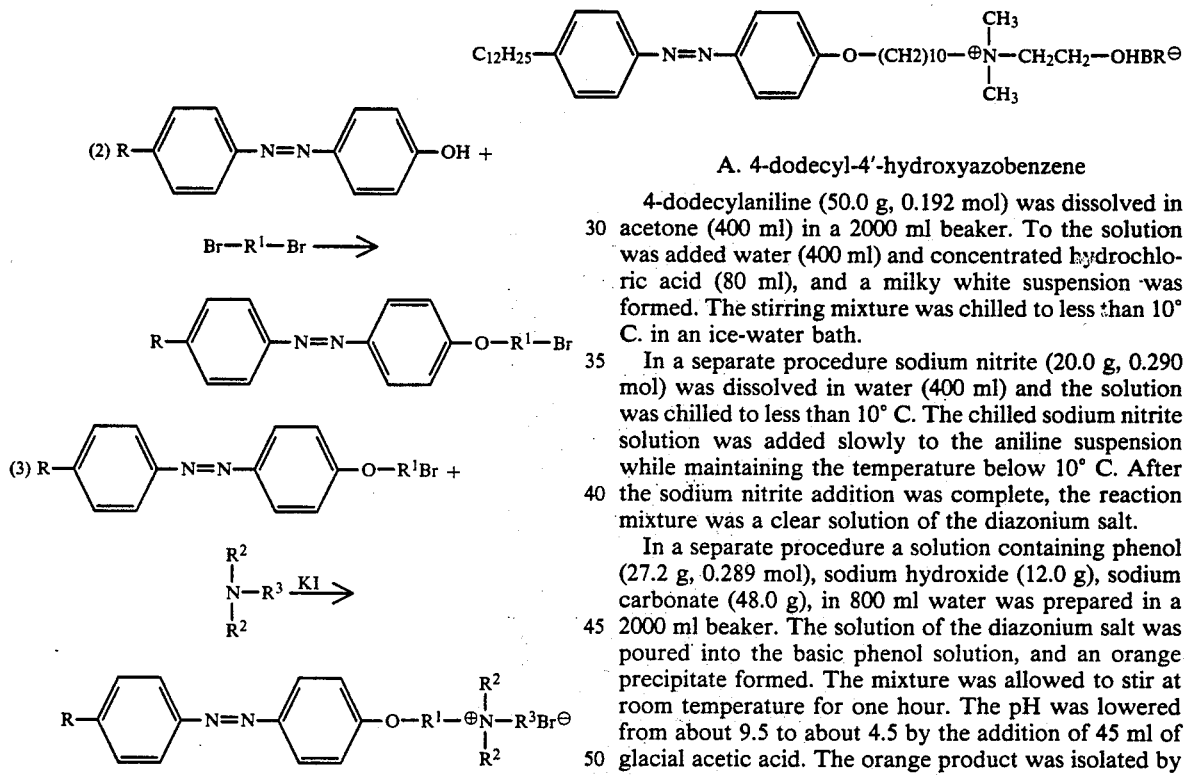

FORMATION OF SELF-ASSEMBLED COMPOSITES

An aqueous formulation of amphiphilic compound and nonionic water-soluble polymer is applied to a supporting substrate, and the applied coating is dried to form a thin film on the substrate surface. The aqueous formulation can be applied by conventional coating techniques such as spin-coating, knife-coating, web-coating, and the like.

The supporting substrate can be any dimensionally stable material such as glass, silicon or plastic. The thickness of the thin film coating on the substrate can be varied in the range between about 0.1-50 microns. The thin film can be stripped from the substrate surface in the form of an optically transparent film which is free-standing and self-supporting.

During the drying phase of the thin film formation procedure, the amphiphilic compound rearranges into self-assembled ordered bilayers, and the bilayers become incorporated into a composite. The drying can be performed under ambient conditions, or under ramped conditions with control of humidity and temperature utilizing a Tenney type chamber.

A preferred thin film optical medium of the present invention is one in which the nonionic water-soluble polymer component is a hydroxyalkylcellulose. The type of thin film medium exhibits excellent optical clarity, and can be utilized as an optical waveguide. The synthesis and structure of hydroxyalkylcelluloses are described in U.S. Pat. Nos. 3,278,521 and 4,661,589.

EXAMPLE I

This Example illustrates the synthesis of 10-[-4[[4-dodecyl)phenyl]azo]phenoxy]-N-(2-hydroxyethyl)-N,N-dimethyl-1-decanamonium bromide.

A. 4-dodecyl-4'-hydroxyazobenzene 4-dodecylaniline (50.0 g, 0.192 mol) was dissolved in acetone (400 ml) in a 2000 ml beaker. To the solution was added water (400 ml) and concentrated hydrochloric acid (80 ml), and a milky white suspension was formed. The stirring mixture was chilled to less than 10° C. in an ice-water bath.

In a separate procedure sodium nitrite (20.0 g, 0.290 mol) was dissolved in water (400 ml) and the solution was chilled to less than 10° C. The chilled sodium nitrite solution was added slowly to the aniline suspension while maintaining the temperature below 10° C. After the sodium nitrite addition was complete, the reaction mixture was a clear solution of the diazonium salt.

In a separate procedure a solution containing phenol (27.2 g, 0.289 mol), sodium hydroxide (12.0 g), sodium carbonate (48.0 g), in 800 ml water was prepared in a 2000 ml beaker. The solution of the diazonium salt was poured into the basic phenol solution, and an orange precipitate formed. The mixture was allowed to stir at room temperature for one hour. The pH was lowered from about 9.5 to about 4.5 by the addition of 45 ml of glacial acetic acid. The orange product was isolated by suction filtration and repeatedly washed with water. The crude product was dissolved in 1600 ml of acetone and then precipitated with 1500 ml of water. The orange precipitate was filtered by suction then dried at 40° C in a forced air oven for 2 hours. The yield was 68.6 g, 97.9%.

TLC on Merck grade 60 silica gel plate, with ethyl acetate eluent, gave two yellow spots. The major component had an $R_F$ of 0.685. The proton NMR spectrum was recorded for the product in CDCl$_3$ and indicated that the product was at least 98 mole percent pure.

B. 4-(10-bromodecyloxy)-4'-dodecylazobenzene

A 3000 ml three-necked round bottom flask was equipped with magnetic stirring, a heating mantle, a reflux condenser, and a nitrogen atmosphere. The flask was charged with 4-dodecyl-4,-hydroxyazobenzene (60.0 g, 0.164 mol), 1,10-dibromodecane, (66.95 g, 0.223 mol), potassium hydroxide (9.75 g, 0.174 mol), and ethanol (1260 ml). The solution was refluxed for seven hours. During the course of the reaction, a yellow precipitate formed in the reaction mixture. The reaction mixture was cooled to room temperature and chilled in an ice-water bath. A crude product was isolated by suction filtration, washed with water, then with hexane. The product was recrystallized from ethyl acetate.

C.
10-[4-[[4-(dodecyl)phenyl]azo]phenoxy]-N-(2-hydroxyethyl)-N,N-dimethyl-1-decanamonium bromide A 3000 ml three-necked round bottom flask was equipped with magnetic stirring, a heating mantle, a reflux condenser, and a nitrogen atmosphere. The flask was charged with 4-(10-bromodecyloxy)-4'-dodecylazobenzene (40 g, 0.068 mol), dimethylethanolamine (95.2g, 1.068 mol) and 1050 ml of tetrahydrofuran. The reaction mixture was allowed to reflux for 24 hours. During the course of the reaction, a yellow solid precipitated from the reaction mixture. After 24 hours, the reaction mixture was cooled to room temperature, and then chilled in an ice-water bath. The crystalline solid was isolated by suction filtration. The crude product was dissolved in hot methanol and filtered to remove insoluble impurities. The methanol was removed by evaporation at reduced pressure. The crude product was recrystallized from tetrahydrofuran. Yield 28.0 g, 61.0%.

EXAMPLE II

The Example illustrates the production of a self-assembled multiple amphiphilic bilayer composite in accordance with the present invention.

0.8 g of the Example I azobenzene was added to 30 g of Millipore DI water and then sonicated with a Heat Systems—Ultrasonics Inc sonicator model W-375 for 4 minutes using a 50% duty cycle and at an output control of 3. The solution was allowed to cool to room temperature, whereupon 0.4 g of hydroxypropylcellulose (HPC, average MW of 1,000,000, Scientific Polymer Products) was added. The solution was tumbled in a rotational tumbler for about 16 hours to dissolve the polymer. The solution was then filtered utilizing a Millipore pressure cell and a prefilter type AP 15-047-00 and a final filter type RA 1.2 μm, and a nitrogen pressure of 30 psi. At the end of the filtration the pressure was increased to 60 psi.

Glass and quartz substrates were cleaned with hot acetone followed by 50° C., 50% nitric acid cleaning, and then rinsed for 5 minutes under flowing Millipore DI water, and stored under water.

The substrates were spin-dried by spinning a 750 rpm for 60 seconds on a Solitec spin coater located in a class 10 clean room. The substrate was next full flooded with the azobenzene HPC solution and spin coated for 120 seconds at rates of 450-2000 rpm. In all cases the spin coating resulted in smooth transparent films.

The samples were placed in individual, covered petri dishes and then allowed to dry overnight at 19° C. and 40-60% RH. The films appeared amorphous when viewed from above, that is perpendicular to the film surface.

EXAMPLE III

A 0.4 g amount of the Example I azobenzene amphiphile was added to 7.59 g of water and sonicated for 2 minutes. The solution was added to a HPC solution which was prepared by dissolving 0.133 g of HPC (M.W. 1,000,000) in 2.53 g of water and tumbled for about 16 hours. The combined solution was filtered for several hours, then the solution was filtered through a prefilter 7 and a 1.2 μm RA filter. The viscosity of the solution was 1060 cps. The solution was spin coated onto clean glass substrates for 2 minutes and at speeds of 1000, 2000 and 4000 rpm, yielding film thicknesses of 2.6, 1.5 and 0.9 μm respectively. All samples appeared clear, transparent and homogeneous when viewed from above, that is, perpendicular to the film surface.

PHOTOINDUCED BIREFRIGERENCE

The optical media produced in accordance with Examples II and III is treated with a 473 nm laser for 30 seconds at 1.4 Watts to create a birefringent zone, that is, the laser treated portions exhibit birefringence with respect to an incident light beam from above (perpendicular to the film plane) whereas untreated portions do not. Accordingly, the films of the present invention may be used as optical recording media.

What is claimed is:

1. A thin film optical medium which is a composite, comprising a nonionic water-soluble polymer having a molecular weight in the range of from 50,000 to 2,000,000 and a solubility in water of at least 1–10 weight per cent at 25° C. and being selected from the group consisting of hydroxyethylcellulose, hydroxypropylcellulose, guar gum, locust bean gum and xanthan gum and a self-assembled bilayer of an amphiphilic compound corresponding to the formula:

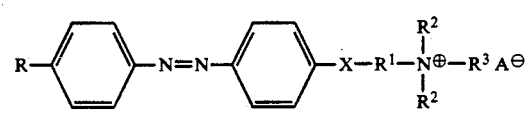

where R is an aliphatic substituent having a chain length of about 6–18 atoms; $R^1$ is a divalent aliphatic moiety selected from the group consisting of ethylene, butylene, decylene, docecylene and polyethylene; $R^2$ is hydrogen or a $C_1$–$C_4$ alkyl substituent, X is a divalent electron-donating substituent; $R^3$ is methyl or hydroxyethyl and A is an anion wherein the ratio of said polymer component and said amphiphilic compound is from about 0.3 to about 0.5 and wherein said medium is transparent when viewed perpendicular to the film surface, said polymer being present in an amount from about 20 to about 80 weight per cent.

* * * * *